CRYOPUMPING CONFIGURATION

Filed Sept. 20, 1965 3 Sheets-Sheet 1

INVENTORS
EDWARD R. BLANCHARD
MICHAEL JORDAN
BY Jonathan Blount
ATTORNEY

CRYOPUMPING CONFIGURATION

Filed Sept. 20, 1965 3 Sheets-Sheet 2

INVENTORS
EDWARD R. BLANCHARD
MICHAEL JORDAN
BY Jonathan Blaut
ATTORNEY

INVENTORS
EDWARD R. BLANCHARD
MICHAEL JORDAN
BY Jonathan Plant
ATTORNEY

United States Patent Office 3,360,949

Patented Jan. 2, 1968

3,360,949

CRYOPUMPING CONFIGURATION

Edward R. Blanchard, Summit, and Michael Jordan, Union, N.J., assignors to Air Reduction Company, Incorporated, New York, N.Y., a corporation of New York Filed Sept. 20, 1965, Ser. No. 488,698
19 Claims. (Cl. 62—55.5)

ABSTRACT OF THE DISCLOSURE

This invention is related to an improved form of cryopump in which the cryoplate is positioned in a chamber so that it extends in a direction generally parallel to the incoming gas. The cryoplate is shielded from radiant heat by a single row of half-chevron baffles which are angularly oriented to facilitate the gas flow through the baffles.

This invention relates to cryogenic pumping, and more particularly to the producing of high vacuum in a chamber, such as a space-simulation chamber, or for very long accelerators.

A vacuum is produced by removing gaseous molecules from a chamber. Any device which accomplishes this is called a "pump." There is a great variety of pumps. Pumping may be accomplished by displacement, transfer of momentum, condensation or absorption, chemical reaction, ionization and acceleration into a surface, or diffusion through a semi-permeable membrane. Many pumps involve combinations of these methods.

In principle, one of the simplest methods for removing gas from a volume is to deposit or condense the gas on the walls of the vessel by reducing the temperature. If the gas is removed by condensation on a very cold surface (such that its vapor pressure is negligible), the term "cryogenic pumping" or "cryopumping" is applied.

The rate of removal of a gas depends upon the condensation coefficient of the gas at the temperature of the surface and on the cold surface area available. The condensation coefficient is the fraction of molecules that stick to the surface, divided by the number that strike the surface. A simple calculation indicates that a liquid-nitrogen-cooled unbaffled surface has a pumping speed of about 11 liters per-second-per-square-centimeter for air. However, when hydrogen or helium is used, because of the necessity of shielding the cold surface (cryoplate) from radiant heat, the theoretical maximum pumping speed is reduced to less than one half of the theoretical value without shielding. But, because the cryopump is directly within the volume to be evacuated, there are no further reductions in pumping speed, as is the case with other pumping devices which have to be connected to the volume by means of flow-restrictive conduits. Furthermore, cryopumps are characterized by their retention of a constant pumping speed over a wide range of vacuum.

One factor which affects the operation of cryogenic pumps is the extent to which the radiation shield interferes with the passage of gas to the cryogenic plate. It is necessary to achieve a balance between the effective shielding of the cryoplate from radiation and ease of flow of gas to the cryoplate. Thus an increase in the coefficient of gas transmission through the radiation shield without substantially increasing the radiation load on the cryoplate improves the operation of the pump.

It is an object of this invention to provide improved apparatus for cryopumping. The invention increases the coefficient of gas transmission through the radiation shield that is used to stop the radiation of heat to the cryoplate on which the gas condenses; but in the preferred embodiment of the invention, this increased coefficient of gas transmission is obtained while providing efficient screening of the cryoplate from radiation emitted at temperatures higher than 78° K.

The cryoplate is refrigerated with liquid helium, cold helium vapor or liquid hydrogen, and is shielded from radiation by a system of covers and optical baffles which are refrigerated with liquid nitrogen. The baffles precool the gas, but are preferably not cold enough to condense it. A temperature of from 77° to 100° K. is commonly used for the radiation shields when air is to be pumped, and the preferred embodiment of this invention refrigerates the radiation shield within this range. This precooling of the gas increases the ratio of the molecules which adhere to the cryoplate to the total molecules which strike the cryoplate; that is, the precooling increases the condensation coefficient.

There exists an inverse relationship between the pumping speed and the degree of radiation shielding. The unshielded cryoplate would approach the theoretical pumping speed but would be exposed to maximum radiation, whereas a totally enclosed cryopump would have zero pumping speed with complete radiation shielding. Since gas molecular behavior in the high vacuum region is similar to radiant-heat behavior, there is a direct relation between the transmission of gas and the transmission of radiation through an incomplete shield, such as baffles.

Another object of this invention is to provide a cryopump with high versatility which possesses a significantly improved radiation baffle system from the gas conductance point of view. We have discovered that this may be accomplished by positioning the primary cryoplate parallel to the incoming gas flow. A secondary cryoplate may be provided behind a second series of baffles, which further improves the pumping speed but which can be used in some applications as a refrigerator for adsorbent materials such as charcoal, to remove non-condensable gases (such as helium and hydrogen) if the cryoplate is refrigerated only to 20° K.

The above-mentioned cryoplate orientation makes it possible to use "half-chevron" baffles (single plate) instead of the highly restrictive full chevron (two plates inclined in opposite direction connected at the apex).

The distance from the base to the outer edge, measured perpendicular to the plane of the baffles, and hereafter called "height," of the primary cryoplate or fin, is determined by the sticking coefficient of the cryoplate and has an optimum value. (If this height is too short, the penetrating gas will be permitted to escape back into the vacuum chamber; if it is too long, some of its surface will do no pumping.)

In general, the pumping efficiency of a cryopump is strongly dependent on the baffle design. Furthermore, for any given type of baffle geometry, the gas transmission through the baffles can be varied by changing one or more dimensions of the baffles. The efficient baffle design is based on the foreknowledge of the effect of changing the dimensions of the baffles on their gas-transmissive ability. Such knowledge will enable the designer to determine the optimum geometry of the baffles for best gas transmission, while retaining the desired optical density.

The pumping efficiency of the cryopump is determined not only by the transmission coefficient of the baffles, but also by the height of the fin, the size of the cryopump "compartment," and other factors, since no gas is able to impinge directly on the cryopump after penetrating through the baffles.

Another object of the invention is to provide an improved combination of radiation shield and cryoplate configuration for cryopumping with an effcient balance between radiation shielding and pumping speed. The cryopump of this invention is applicable to a wide variety of vacuum-chamber configurations and thermal environments.

Other objects, features and advantages of this invention will appear or be pointed out as the description proceeds.

In the drawing, forming a part hereof, in which like reference characters indicate corresponding parts in all the views.

Figure 3:
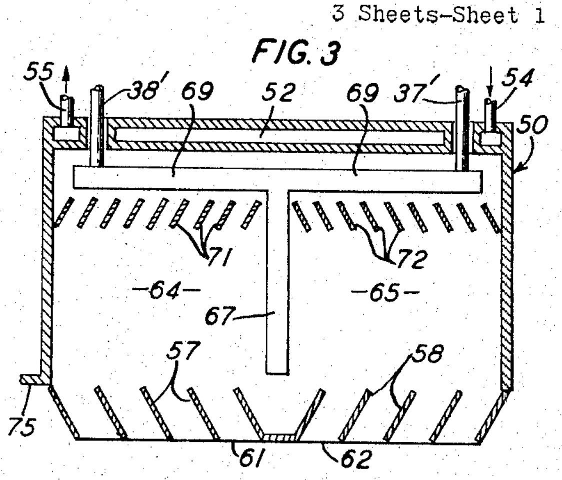
FIGS. 2 and 3 are diagrammatic views, similar to FIG. 1, and showing other embodiments of the invention.
Figure 2:
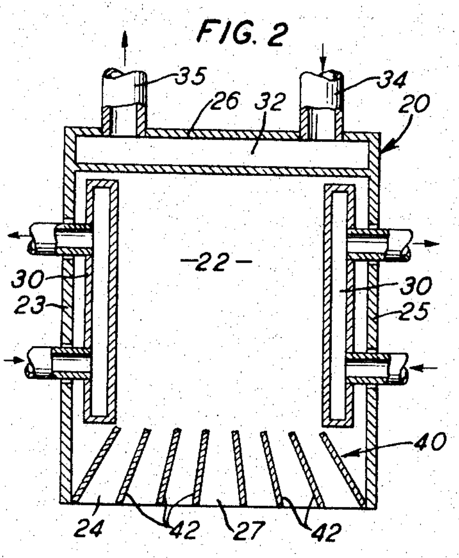
Figures 4A, 4B:
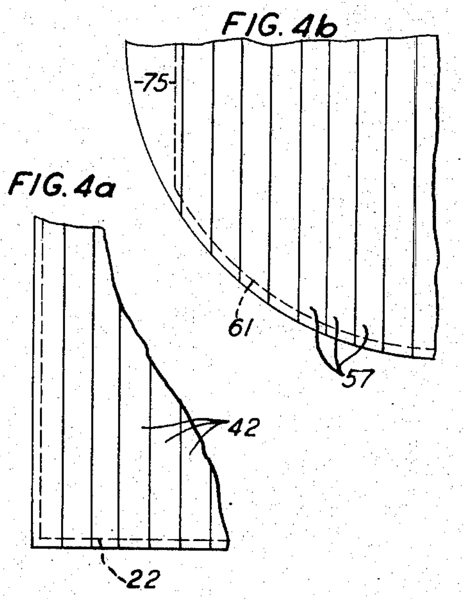
Figure 5:
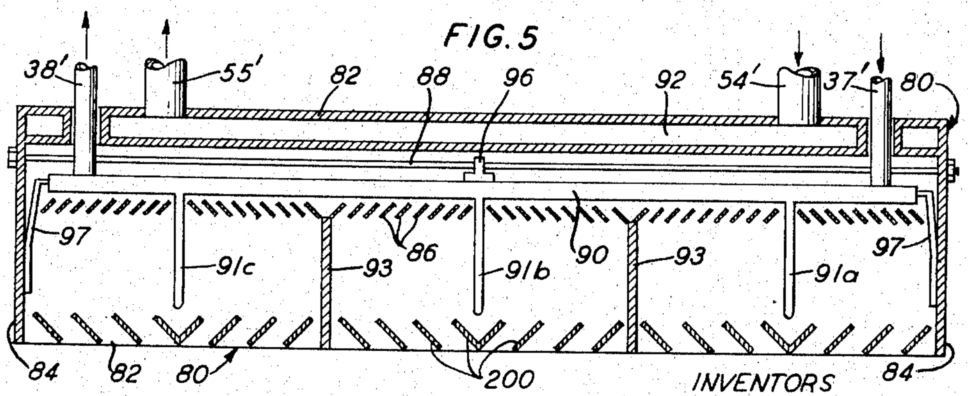
Figure 6:
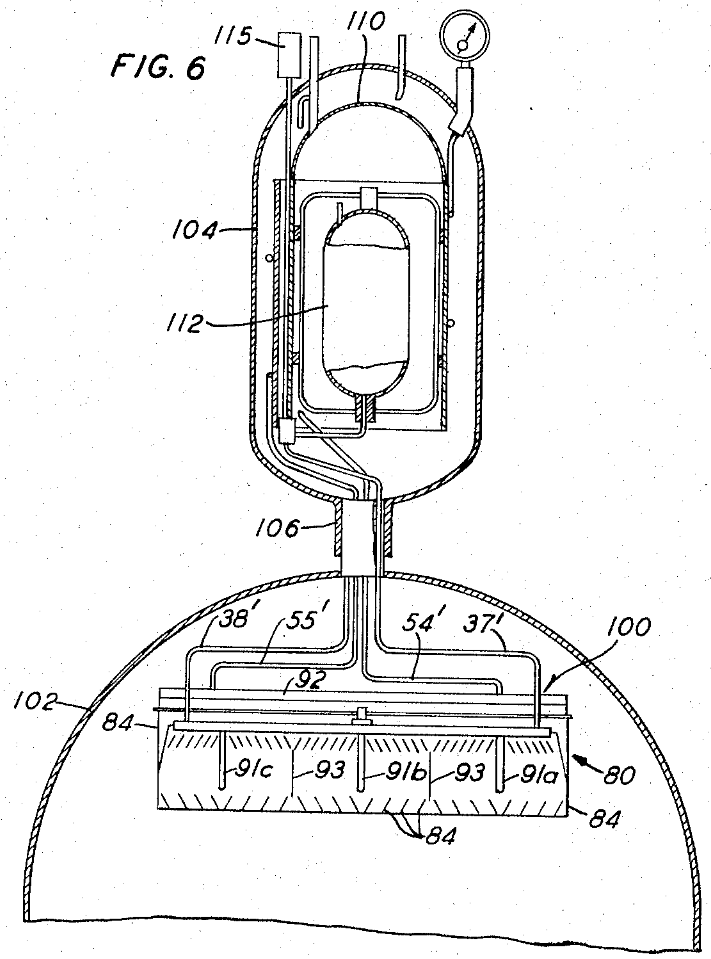
Figure 7:
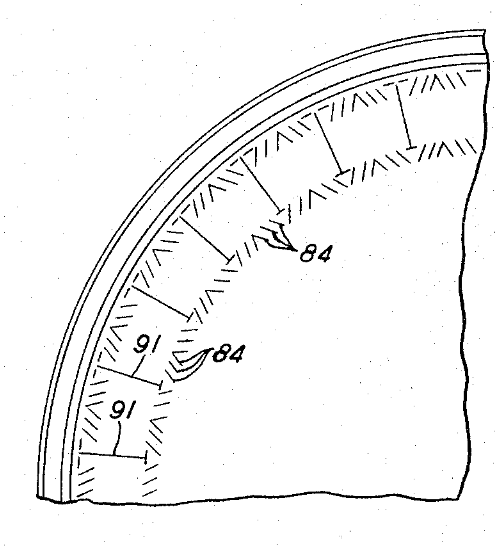

FIGS. 4*a* and 4*b* are fragmentary front views of portions of the structure shown in FIGS. 2 and 3;

FIG. 5 is a fragmentary, diagrammatic view of another embodiment of the invention;

FIG. 6 shows the apparatus of FIG. 5 located in a chamber and connected with sources of refrigerant;

FIG. 7 is a fragmentary view showing another modification of the invention; and

Figure 8:
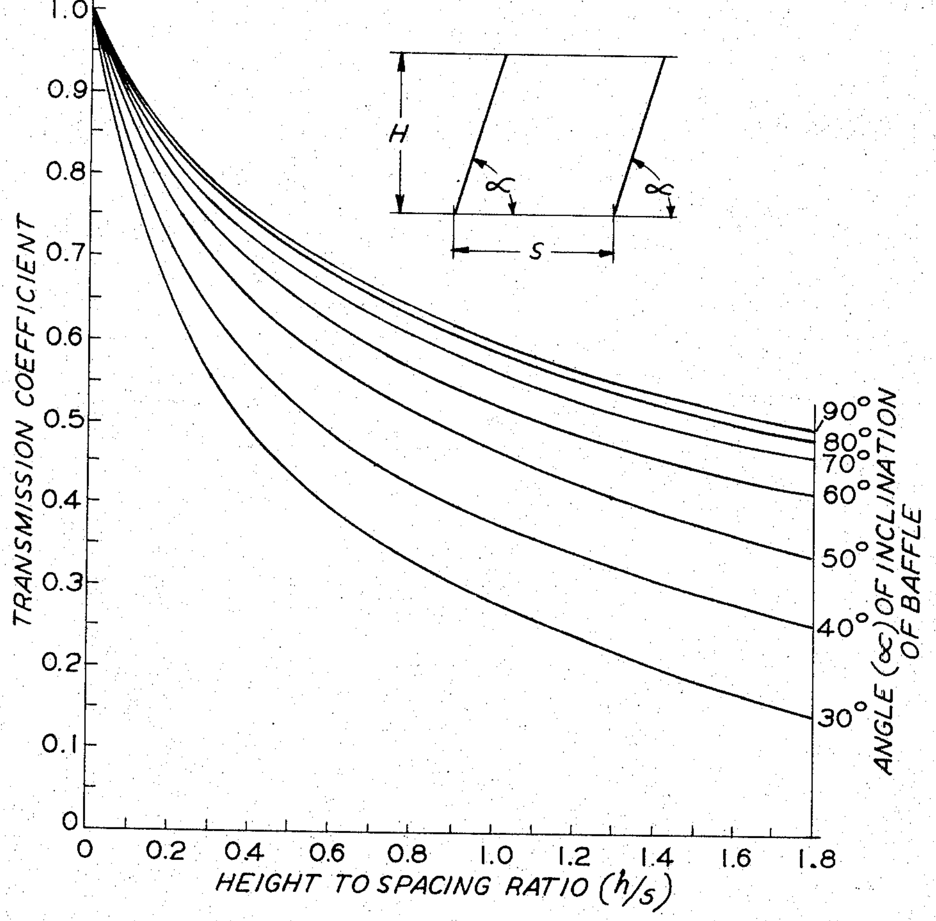

FIG. 8 is a chart showing the variation of the transmission coefficient of the baffles.

Figure 1:
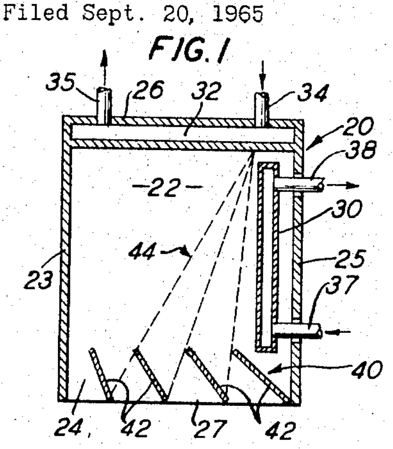
FIG. 1 is a diagrammatic view illustrating the principle of this invention.

FIGURE 1 shows the simplest form of this invention. A radiation screen 20 forms a chamber 22. This radiation screen 20 has walls 23, 24, 25, and 26. There is a corresponding wall opposite the wall 24 ahead of the plane of section. The bottom of the chamber 22, as shown in FIG. 1, has an opening 27 through which gas can enter the chamber.

A cryoplate 30 is independently suspended in the chamber 22 and extends in a direction at right angles to the bottom wall in which the opening 27 is formed. The back wall 26 is either a hollow compartment 32 or is equipped with a series of interconnected tubes through which refrigerant fluid is circulated. In the illustrated construction, the refrigerant fluid enters the compartment 32 through inlet pipe 34 and flows out of the compartment through an outlet pipe 35. The cryoplate 30 is similarly supplied with refrigerant fluid through an inlet pipe 37 and an outlet pipe 38.

There is a radiation shield 40 across the opening 27. This radiation shield 40 includes a plurality of louvres 42. The louvres are eqaully spaced from one another along the line of opening 27 and they slope away from the cryoplate 30 as they extend upward. They are connected to the wall 24 and the wall opposite to 24 and are thus cooled by conduction to a temperature nearly equal to the temperature of the shield. The broken lines 44 indicate the limits of the field of vision through the spaces between the louvres 42 on the side of the field nearer to the cryoplate. It will be apparent that the cryoplate 30 is not within the field of vision, through any of the spaces between any of the louvres or baffles 42, and thus the baffles 42 obtain "total optical density" insofar as the cryoplate 30 is concerned. It should also be noted that the baffles 42 are "half-chevron," and this is advantageous because the flow of gas between such baffles is obstructed much less than with full-chevron baffles. Furthermore, although the baffles can be set to be parallel to each other, the preferred embodiment is that each of the baffles 42 possesses a different angle of inclination (slope) which is established through numerical calculations to result in the most efficient gas-transmission characteristics.

The important criterion which determines the gas-transmissive efficiency, is the interrelationship between the baffle height and the baffle spacing. It can be clearly seen that if the baffles are closely packed together, a long and narrow passage will be created between each set of adjoining baffles. The transmission efficiency will increase as the separation between the baffles is increased, until a theoretical 100% efficiency is attained when the separation becomes significantly greater than the mean free path of the gas (the average distance a molecule travels before it collides with another gas molecule). If the baffles are inclined with respect to the gas inlet plane (the outer edge of the baffles facing the vacuum chamber), the transmission efficiency is further reduced. FIG. 8 also demonstrates the importance of knowing the magnitude of the transmission coefficient for each baffle set in order to arrive at an optimum value for the whole baffle system, since it is apparent that the variation of the transmission coefficient with respect to the geometry of the baffles is nonlinear and cannot be simply extrapolated from a single value.

For best performance, the baffles must be individually oriented at different angles of inclination, the angle being the least angle which can be used and still obtain "total optical density." It is desirable, however, to maintain the baffles at constant spacing, as previously described.

Liquid nitrogen is preferably circulated through the compartment 32, and liquid hydrogen or liquid or cold gaseous helium is circulated through the cryoplate 30. Other fluids can be used, depending upon the kind of gas which is to be removed by the cryopump and the pressures under which the pumping is to be carried out.

FIGURE 2 shows a variation of the invention in which two cryoplates 30 are located at opposite sides. This embodiment provides more collision surface available to the molecules upon which the molecules can stick. Here again the radiation screen 20 forms a chamber 22. This radiation screen 20 has walls 23, 24, 25, and 26. There is a corresponding wall opposite wall 24 ahead of the plane section. The bottom of the chamber 22, as shown in FIG. 2, has an opening 27 through which gas can enter the chamber 22. The radiation shield 40, across the opening 27, includes a plurality of louvres 42, so disposed as to result in optical density with respect to the two cryoplates 30. Flow of the refrigerant fluids is the same as in FIG. 1 and bears the same reference characters.

FIGURE 3 shows a modified form of the invention. A radiation screen 50 is longer than the screen 20 of FIG. 1 and it has a hollow back wall 52 through which refrigerant fluid flows; with the supply of fluid through a pipe 54 and the exhaust or outlet for the fluid through a pipe 55. All of the walls of the radiation screen 50 are cooled by conduction of heat into the refrigerant in the back wall 52. The walls are preferably made of metal which provides good conduction of heat. Louvers or baffles 57 and 58 are also preferably made of highly conductive metal, or other good heat-conducting material, and are attached at the opposite ends to walls of the radiation screen 50 so that these baffles 57 and 58 are also cooled by the refrigerant fluid in the hollow back wall 52. It will be evident that side walls and other parts of the construction can be made hollow for the circulation of refrigerant coolant if the cryopump is of such large size that the distances are too great for satisfactory dissipation of heat by conduction.

The radiation screen 50 has two openings 61 and 62 in its bottom wall. The baffles 57 protect the opening 61 in the same way as the baffles 42 of FIG. 1. Other baffles 58, which slope in the other direction, protect the opening 62. The difference in the direction of slope of the baffles 57 and 58 is necessary because the chambers 64 and 65, located above the baffles 57 and 58 respectively, have the cryoplate surface at a different end of the chamber.

It is a feature of the construction shown in FIG. 2 that there is only one cryoplate 67 for both of the chambers 64 and 65. This cryoplate 67 forms a common wall separating the chambers 64 and 65 and the opposite sides of the cryoplate 67 constitute the cryopump surface for the respective chambers.

Another modification in the construction shown in FIG. 3 is that there is a cryoplate 69 extending along most of the area of the wall 52 at the top of both of the chambers 64 and 65. In the preferred construction, the cryoplate 67, which divides the chambers 64 and 65, is merely a partition portion of the cryoplate 69. Since the cryoplate 69 is within the field of vision observed by looking through the spaces between the baffles 57 and 58 from outside the radiation screen 50, it is necessary to provide other baffles 71 and 72 in front of the portions of the cryoplate 69 at the upper ends of the chambers 64 and 65 respectively.

The presence of the added cryoplates 69 further improves the pumping efficiency of the cryopump by allowing some of the gas which would not impinge on cryoplate 67 to pass through baffles 71 and 72 and be frozen on cryoplates 69.

The baffles 71 and 72 slope in the opposite direction from baffles 57 and 58 and are spaced close enough together so that they cooperate with the baffles 57 and 58 to obtain total optical density for the cryoplate 69. The slopes of the baffles 71, 72, 57 and 58 should again be different and established to result in best gas-transmission conditions. Flow of refrigerant to the cryoplates 69 and 67 is through pipes indicated by the same reference characters as in FIG. 1 but with a prime appended.

FIGURE 4*a* is a fragmentary front view of a radiation screen in which the opening 27 is substantially rectangular; and FIG. 4*b* is a similar view with the opening 61 substantially circular. It will be understood that this invention lends itself to the manufacture of cryogenic pumping apparatus of various sizes and shapes. Baffles 42 and 57 are connected to chamber walls 22 and 75, respectively, at the ends of the baffles.

FIGURE 5 shows one possible way by which the cryopump can be upscaled from a single cryoplate 30, as shown in FIG. 1, to a multi-fin unit. This lateral upscaling is important since elongation of the fin in the vertical plane of the figures to create more cryodeposit surface, does not increase the pumping speed in any significant manner. A radiation screen 80 is formed with long parallel walls 82 and end walls 84 so as to make an elongated chamber. Primary baffles 200, corresponding to the baffles 42, 57, and 58 of FIGURES 1 and 3, and secondary baffles 86, corresponding to the baffles 71 and 72 of FIG. 2, are connected at their opposite ends to the elongated walls 82. These walls 82 and 84, together with the connected baffles 200 and 86, and permanent partitions 93, are preferably made as a sub-assembly and all connected together as an integral unit. This sub-assembly comprises the support for not only the baffles 200 and 86, which are preferably independently connected; but also for a cryoplate 90 and a refrigerating means 92 for the baffles, which is mounted on the top end of screen 80.

The cryoplate 90 has partition portions (fins) 91*a*, 91*b* and 91*c* dividing the elongated chamber of the radiation screen 80 into separate chambers having a common cryoplate partition between them as in the case of the construction shown in FIG. 3. However, the elongated radiation screen 80 of FIG. 5 has different groups of chambers and each group of two chambers, having a cryoplate partition portion between them, is separated from the next group by a permanent partition 93 which is preferably a part of the radiation screen 80 with the opposite ends of the partition 93 connected to the elongated parallel walls 82.

The cryoplate 90 with its partition portions 91*a* and with a refrigerant supply pipe 37' and outlet pipe 38', constitutes another sub-assembly of the apparatus. This sub-assembly is connected with the anchor bar or rod 88 by a bracket 96 and is connected at opposite ends with the end walls 84 by brackets 97.

For refrigerating the baffles 200 and 86 and the walls of the elongated radiation screen 80, the hollow liquid reservoir 92 is constructed as a separate sub-assembly and this reservoir 92, which forms one wall of the elongated radiation screen 80, is connected at opposite ends to the end walls 84 and is connected at opposite sides to the elongated side walls 82. The hollow elongated wall or reservoir 92 carries a refrigerant inlet pipe 54' and a refrigerant outlet pipe 55'.

The cryopump assembly shown in FIG. 5 is indicated generally by the reference character 100 and FIG. 6 shows this cryopump assembly 100 located in a container 102 which encloses a vacuum chamber. FIGURE 6 also shows a portable liquid container 104 which is secured to the upper end of the container 102 by a connector 106. This portable liquid container includes a liquid nitrogen reservoir 110 and a liquid helium or hydrogen reservoir 112. The reservoir 110 is connected with the pipes 54' and 55', and the reservoir 112 is connected with the pipes 37' and 38'. The cryopump can be installed either vertically, horizontally, or at any intermediate angle within the vacuum chamber.

FIGURE 6 shows a typical installation, in which both cryogenic fluids are supplied from portable reservoirs. The portable reservoir serves here as a supply vessel for the liquid helium or hydrogen. Since the consumption of these fluids is low for small cryopumps, this is the preferred technique, because it reduces cooldown losses incurred due to intermittent transferring of fluids from a remote reservoir through insulated tubes.

The consumption of the shield refrigerant (liquid nitrogen) on the other hand is larger, and must be made up from larger dewar-type vessels. The liquid nitrogen reservoir 110 is used to provide added refrigerative insulation to the liquid helium or hydrogen reservoir 112 while the portable fluid container is in use. As a convenience, reservoir 110 is also used as an intermediate transfer vessel for the liquid nitrogen which is used for the cryopump screen cooling. In this manner, it acts as a buffer while the primary liquid nitrogen supply is replenished. It also acts as a vapor liquid separator in the event that liquid nitrogen is being percolated through the vent tube 55'. For large installations where the consumption of both the screen and the cryoplate refrigerants becomes very high, these refrigerants can be piped directly from larger dewar containers, or from refrigeration machines.

The liquid helium or hydorgen flow is controlled by a solenoid valve 115 activated by a temperature sensor such as a carbon resistor or a vapor pressure thermometer built into the cryoplate. The sensor activation temperature should be adjusted between 4 and 15° K. For use of liquid hydrogen, the vent tube must be fitted with a special attachment and vented outdoors away from any flame or spark source. A somewhat different temperature sensor is required for hydrogen than for helium but the specific structure of these controls forms no part of the present invention.

FIGURE 7 is a fragmentary view showing a construction, which is similar to that shown in FIG. 5, but made with the succesive chambers located around a circle instead of along a straight line. The baffles on the front walls of the chambers are located around a circle so as to form a louvered cylindrical surface. This figure is included to illustrate that this invention can be made in various shapes, depending upon the container in which it is to be used. The louvered surface leading into chambers containing cryoplates can extend around the full circumference of a cylindrical container such as illustrated by one quadrant in FIG. 7.

The preferred embodiments of the invention have been illustrated and described, but changes and modifications can be made and some features can be used in different combinations without departing from the invention as defined in the claims.

We claim:

1. A cryopump including wall means enclosing a chamber having an opening for the flow of gas into the chamber, a cryoplate in the chamber extending in a direction substantially parallel to the incoming gas flow, radiation shield means in the opening composed of a single row of baffles, a plurality of said baffles having a half-chevron configuration, said radiation shield means and the wall means screening the cryoplate from the direct radiation of heat originating outside the chamber.

2. The cryopump described in claim 1 in which the cryoplate extends substantially at right angles to the radiation shield means.

3. The cryopump described in claim 1 in which the baffles are angularly positioned with respect to the gas flow into the chamber, a baffle nearer to the cryoplate having a greater angle of inclination with respect to said flow than a baffle in said row which is further away from said cryoplate.

4. The cryopump described in claim 1 having means refrigerating said shield means and further means refrigerating said cryoplate.

5. The cryopump described in claim 1 characterized by the pump including a second chamber having an opening adjacent said first opening, said cryoplate forming a common wall of said chambers.

6. The cryopump described in claim 1 characterized by the cryoplate being located close to and generally parallel to at least a portion of the wall means.

7. The cryopump described in claim 1 characterized by the pump including a plurality of successive chambers having openings with successive groups of two chambers each having a cryoplate forming a common wall between said two chambers.

8. The cryopump described in claim 1 characterized by the pump including a plurality of chambers having openings located along an arc, radiation shield means in said openings to form a louvred arcuate wall.

9. A cryogenic pump including a chamber having a wall, a cryoplate positioned in said chamber adjacent said wall, means to refrigerate said wall and further means to refrigerate said cryoplate to a temperature lower than said wall, a gas inlet on a side of the chamber opposite said wall, substantially planar baffles extending across the inlet, the baffles being spaced from one another, and other baffles on the side of the chamber opposite the first baffles and immediately ahead of the cryoplate and extending in different directions from the first baffles and being positioned with respect to the first baffles to stop direct radiation from outside the chamber from reaching the cryoplate.

10. The cryogenic pump described in claim 9 characterized by said other baffles being shorter than the first baffles and more closely spaced from one another than are the first baffles.

11. The cryogenic pump described in claim 9 characterized by a second cryoplate in the chamber extending in a different direction from the first cryoplate and completely shielded from radiation from outside the chamber by said first baffles.

12. The cryogenic pump described in claim 9 characterized by the first baffles and the second baffles comprising different groups, at least some of the baffles of one group being at a different angle from other baffles of the same group.

13. Cryogenic pumping apparatus including a support, a cryogenic plate carried by the support and connected therewith, a radiation shield on said support, said radiation shield comprising a single row of essentially planar baffles, at least one of said baffles having a different slope relative to another of said baffles, said shield effectively shielding the cryogenic plate from radiation while allowing gas to flow to the cryogenic plate, refrigerating means for the radiation shield connected to the support.

14. The cryogenic pumping apparatus described in claim 13 characterized by the cryogenic plate and the refrigerating means for the radiation shield being subassemblies and each being connected with the support on which the radiation shield is carried.

15. The cryogenic pumping apparatus described in claim 14 characterized by the support including parallel side walls and end walls forming an elongated chamber, the refrigerating means comprising a hollow reservoir of liquefied gas such as nitrogen, said reservoir contacting with the support to cool by conduction the walls and baffles which constitute the radiation shield, and the plate having a passage therein for the flow of liquefied gas refrigerant at lower temperature than in the hollow reservoir, said plate extending along the length of the parallel side walls at a location between said parallel end walls and forming one side of the elongated chamber, said plate having partition portions that are spaced from one another in the direction of the elongated extent of the chamber and that divides said chamber into a plurality of shorter chambers, the partition portions of the plate being fully shielded from view from outside the chamber by the baffles which constitute the radiation shield.

16. A cryogenic pump comprising a chamber having walls, said chamber having an inlet opening through which gas can enter the chamber radiation shield means composed of a single row of substantially planar baffles extending across the inlet, a cryoplate mounted in said chamber, said single row of baffles positioned in such a manner that the cryoplate is not visible from without the chamber.

17. The cryogenic pump described in claim 16, characterized by an additional cryoplate in said chamber spaced from the first mentioned cryoplate, said row of baffles being positioned in such a manner that the cryoplates are not visible from without the chamber.

18. Cryogenic pumping apparatus including a chamber, a cryogenic plate positioned within said chamber, radiation shield means for said plate in said chamber, said means comprising a single row of baffles, essentially all of said baffles having different angles of inclination with respect to one another, each of said angles being predetermined so that the gas transmission efficiency across said baffles is high while said radiation shield means effectively prevents the direct radiation of heat to said plate.

19. A cryopump comprising wall means, a cryoplate and radiation shield means, said cryoplate and said wall means defining two chambers, said cryoplate forming a common wall between said two chambers, each of said chambers having an opening, said radiation shield means extending across said openings, said shield means composed of a single row of baffles, a plurality of said baffles in each opening having a half chevron configuration.

References Cited

UNITED STATES PATENTS

| | | | |
|---|---|---|---|
| 3,081,068 | 3/1963 | Milleron | 62—55.5 |
| 3,122,896 | 3/1964 | Hickey | 62—55.5 |
| 3,131,396 | 4/1964 | Santeler et al. | 62—55.5 |
| 3,137,551 | 6/1964 | Mark | 62—268 |
| 3,175,373 | 3/1965 | Holkenboer et al. | 62—268 |
| 3,188,785 | 6/1965 | Butler | 62—55.5 |
| 3,252,652 | 5/1966 | Trendelenburg et al. | 62—55.5 |
| 3,256,706 | 6/1966 | Hansen | 62—55.5 |

LLOYD L. KING, *Primary Examiner.*